United States Patent [19]

Kouguchi et al.

[11] Patent Number: 5,038,036
[45] Date of Patent: Aug. 6, 1991

[54] CORONA DISCHARGE PROCESSING APPARATUS

[75] Inventors: Kenji Kouguchi; Yu Iriyama, both of Osaka; Katsuaki Furutani, Hyogo; Shouji Ikeda; Akinori Iwata, both of Osaka; Tsuyoshi Terada, Nara, all of Japan

[73] Assignee: Nippon Paint Co., Ltd., Osaka, Japan

[21] Appl. No.: 466,885

[22] Filed: Jan. 18, 1990

[30] Foreign Application Priority Data

Dec. 19, 1989 [JP] Japan .................. 1-330855

[51] Int. Cl.⁵ .......................................... H01T 19/00
[52] U.S. Cl. ..................................... 250/324; 264/22; 204/164; 204/165; 204/168; 422/186.05; 422/907
[58] Field of Search ................ 250/324, 325, 326; 361/225, 229, 230; 264/22; 204/164, 165, 168; 422/186.05, 907

[56] References Cited

U.S. PATENT DOCUMENTS

| | | |
|---|---|---|
| 3,102,193 | 8/1963 | Dobens . |
| 3,135,676 | 6/1964 | Rothacker .............. 422/186.05 |
| 3,183,352 | 5/1965 | Brandt et al. . |
| 3,655,966 | 4/1972 | Takimoto et al. . |
| 4,295,178 | 10/1981 | Spengler ................. 361/230 |
| 4,336,565 | 6/1982 | Murray et al. ............ 361/225 |
| 4,556,795 | 12/1985 | Tietje .................... 250/324 |
| 4,772,788 | 9/1988 | Tsutsui et al. . |

FOREIGN PATENT DOCUMENTS

| | | |
|---|---|---|
| 0228247A2 | 12/1986 | European Pat. Off. . |
| 0275693 | 7/1988 | European Pat. Off. . |
| 3619178 | 12/1987 | Fed. Rep. of Germany . |
| 1526070 | 9/1978 | United Kingdom . |
| 2114377 | 8/1983 | United Kingdom . |

OTHER PUBLICATIONS

Patent Abstracts of Japan, vol. 11, No. 376, (C-463) [2826].

Primary Examiner—Jack I. Berman
Attorney, Agent, or Firm—Armstrong, Nikaido, Marmelstein Kubovcik & Murray

[57] ABSTRACT

An object of the invention is to present a corona discharge processing apparatus capable of performing uniform and excellent corona discharge processing, on work of any thickness or shape, with the constant processing effect regardless of a thickness and shape of the work.

A corona discharge processing apparatus of the invention comprises an excitation electrode and a counter-electrode, and generates a corona discharge by applying a high voltage between them, thereby applying corona discharge processing on the work, wherein the excitation electrode and the counter-electrode are both disposed on the same surface of the work with an interval between them.

16 Claims, 9 Drawing Sheets

CORONA DISCHARGE PROCESSING APPARATUS

BACKGROUND OF THE INVENTION

The present invention relates to a corona discharge processing apparatus, and more particularly to a corona discharge processing apparatus for improving surface properties of synthetic resin products.

Corona discharge processing is employed for improving the surface properties such as adhesion and coating performance of synthetic resin formings and synthetic resin films, by making use of the corona discharge generated between electrodes when a high voltage is applied.

A structure of a corona discharge processing apparatus is disclosed in the Japanese Official Patent Gazette No. 60-46133. In this apparatus, on a synthetic resin forming supported by a movable base electrode, a counter-electrode is disposed at the opposite side of the base electrode. The forming is placed between the counter-electrode and the base electrode. In this state, when a high voltage is applied between the counter-electrode and the base electrode, corona discharge is generated. By the generated corona discharge, corona discharge processing is applied for the surface of the forming.

In order to enhance the corona discharge effect, it is required that the interval between the base electrode and the counter-electrode be as short as possible. Therefore, the counter-electrode which moves relatively to the forming is made of a flexible material such as a chain and a metal brush, and is designed to move while deforming along the uneven shape of the forming. The base electrode is formed in the same shape as the back side of the forming. As a result, the base electrode and the counter-electrode can just fit to the both sides of the forming, and the interval between the base electrode and the counter-electrode is set to minimum.

In such prior art, however, it is necessary to fabricate base electrodes of different shapes according to the shape of the forming. Therefore, if the shape of the forming is complicated, it takes much time and cost for fabricating the base electrode. Moreover, if the back shape of the forming and the shape of the base electrode do not fit exactly, a gap is produced between the back face of the forming and the base electrode, and tight contact of the forming with the base electrode is not achieved. Thereby, an electric discharge occurs in the gap between the back surface of the forming and the base electrode, and the discharge energy on the processing surface is lowered, and corona discharge processing of the forming may not be done sufficiently, or the processing may be insufficient.

Yet, as thickness of the forming increases, even if the base electrode and the forming are in tight contact, the distance between the electrodes is extended and corona discharge processing may not be done sufficiently. That is, depending on the thickness of the forming, the processing effect varies and also, there is a certain limit to the thickness of the forming that can be processed.

When the shape of the forming is simple like a sheet, fabrication of the base electrode is relatively easy, but if the thickness of the forming is not uniform due to manufacturing error, the processing effect also fluctuates. If thickness of the sheet is more than tens of millimeters, sufficient processing effect will not be attained with an ordinary applied voltage of 20 to 30 kV.

SUMMARY OF THE INVENTION

It is hence a primary object of the invention to present a corona discharge processing apparatus capable of performing uniform and excellent corona discharge processing, by solving the above-discussed problems of the prior art, on the work of any thickness or shape, with a constant processing effect regardless of the thickness and shape of the work.

To achieve the above object, the corona discharge processing apparatus of the invention comprises an excitation electrode and a counter-electrode, and generates a corona discharge by applying a high voltage between them, thereby applying corona discharge processing on the work, wherein the excitation electrode and the counter-electrode are both disposed on a surface side of the work with an interval between them.

The excitation electrode denotes an electrode to which a high voltage is applied during corona discharge processing, and the counter-electrode is an electrode that is grounded. In the conventional corona discharge processing apparatus, the excitation electrode contacts with a face of the work, and the counter-electrode, with the back, while in the invention the both electrodes are designed to be in contact with one side of the work being treated, that is, with the surface of the work. Specifically, the excitation electrode and the counter-electrode may be in contact with the upper face and also, with the side face or lower face of the work. That is, the electrode setting angle is not limited.

The excitation electrode and the counter-electrode are free in shape and structure as far as they are both designed to be able to contact with the surface of the work and, when a high voltage is applied between the both electrodes, corona discharge is generated along the surface of the work between the both electrodes. For the electrode moving along the surface of the work may be practically used an electrode which has conventionally been used in an ordinary corona discharge processing apparatus. More concretely, are cited a chain-shape electrode, a brush-shaped electrode, a rotary shaft-shaped electrode and a bar-shaped electrode. The excitation electrode and the counter-electrode may be enough if either one is provided, but when a plurality of excitation electrodes and counter-electrodes are provided, a wider surface area of the work can be processed at a time.

In the apparatus of this invention, a means can be provided to oscillate the excitation electrode and the counterelectrode within a plane which is along the surface of the work. The oscillation refers to a motion for drawing a specific trajectory within a relatively narrow region, such as linear motion in a lateral or longitudinal direction, circular motion, elliptical motion and motion in the figure of an eight. The extension of oscillation may be somewhat less than the setting interval of the excitation electrode and the counter-electrode. As the horizontal oscillating means, various horizontal oscillating mechanisms in ordinary machinery may be employed, such as those to convert the rotation of a driving motor into a horizontal motion by cam mechanism, link mechanism, or rack mechanism.

It is desired that either one or both of the excitation electrode and/or the counter-electrode is elastically or resiliently pressed toward the surface of the work. As the means for elastically pressing the electrode toward the surface of the work, a coil spring is preferably used because it is large in the extent of expansion in the lengthwise direction and corresponds flexibly to large variations of the height of the work. Aside from the coil spring, pneumatic or hydraulic spring mechanism may be also employed. The electrodes and a part of the members for supporting the electrodes may be made of a resilient material having an elasticity in the material itself.

It is also desired that either the excitation electrode or the counter-electrode be covered with an insulator. As such insulator, a material having a sufficient durability for the high voltage applied between the excitation electrode and the counter-electrode is used. Practically, various kinds of resins, rubber, ceramics, and heat-proof glass may be used, in particular, a quartz is preferable. The quartz is classified into opaque quartz containing air foams inside, and transparent quartz free from foams, and the transparent quartz is superior in insulation performance. Besides, there are two kinds of quartz natural quartz of relatively low purity and synthetic quartz of high purity and both can be used, but the synthetic quartz is preferable because it excels in insulation quality for a long period. The most preferable material is a synthetic quartz of impurity content of 1 ppm or less. An electrode to be covered with the insulator may be either the excitation electrode or the counter-electrode.

As the other electrode not covered with the insulator, a brush electrode composed by bundling soft conductive metal wires may be used. The brush electrode may be of the same structure as the one used as the moving side electrode in the conventional corona discharge processing apparatus.

As at least one electrode of the excitation electrode and the counter-electrode, a rotary shaft-shaped electrode which rolls along the surface of the work may be employed. The rotary shaft-shaped electrode may be designed to be able to rotate either the whole electrode or only the outer part of the electrode. When covering the electrode with an insulator, it may be designed to rotate only the insulator. Either the excitation electrode or the counter-electrode may be a rotary shaft-shaped electrode, or both may be rotary shaft-shaped electrodes.

As at least one electrode of the excitation electrode and the counter-electrode, a bar electrode disposed upright to the surface of the work may be used. As an example of such structure, one may be used in which a conductive material being led to an electrode is contained inside of a quartz tube, that is an insulator. Either the excitation electrode or the counter-electrode may be a bar electrode or both may be bar electrodes.

The bar electrode may be supported so as to be capable of inclining toward the surface of the work taking the end in the remoter side more remote from the work as the fulcrum. The means to support the bar resiliently so as to be capable of inclining the electrode may include a spring. When the end portion acting as the fulcrum of inclination is fitted to the supporting means that can be elastically deformed, such as a spring, the fulcrum of inclination may move in the axial direction, as the electrode is inclined.

The work and the electrodes may be moved relatively. The relative motion mentioned here means a motion larger than the oscillation of the electrode stated above. For example, by installing a conveying means such as a conveyor mechanism, the work is put on the conveying means and moved until the work contacts with the electrodes of the corona discharge processing apparatus placed at a specific position, so that a wide area of the work may be processed continuously. Moreover, efficient processing may be done by transporting plural works successively to the electrode positions by the conveying means. Or, instead of transporting the work, the electrodes may be installed in a manner so as to move.

The corona discharge processing apparatus relating to the present invention may be favorably applied for improvement of surface properties of synthetic resin formings, such as improvement of adhesion and coating properties, and may be also used in any desired applications where ordinary corona discharge processing apparatuses are utilized.

When a high voltage is applied between the excitation electrode and the counter-electrode which are both disposed at a same surface side of the work having an interval therebetween, a corona discharge is generated along the surface of the work to which the both electrodes contact. This is a phenomenon usually called as creeping corona discharge or creeping discharge. By this corona discharge, the corona discharge processing is applied to the surface of the work between the two electrodes.

When either one or both of the excitation electrode and/or the counter-electrode is elastically pressed toward the surface of the work, even if the surface of the work is uneven, the electrode may securely contact with the surface of the work. In particular, when the processing is carried out while moving the excitation electrode and counter-electrode relatively along the surface of the work, the height of the work contacting with each electrode varies progressively, but it is possible to cope easily with such height variations of the work.

When the excitation electrode and the counter-electrode are supported by an oscillating means which oscillates in a plane along the surface of the work, the entire surface of the work can be uniformly processed with corona discharge. Since the corona discharge is generated in or near the shortest route between the excitation electrode and the counter-electrode, a difference is caused in the processing effect of corona discharge between a position in said shortest route and a position remote from it. Meanwhile, the corona discharge is not generated at the points of the excitation electrode and the counter-electrode contacting with the work. Therefore, as mentioned above, the excitation electrode and the counter-electrode are oscillated within a plane along the work surface. Then, the generating position of corona discharge sequentially moves within a specific range, so that uniform corona discharge may be applied for the entire surface of the specific range.

When either the excitation electrode or the counter-electrode is covered with an insulator, the excitation electrode and the counter-electrode may be electrically isolated. In this invention, since the excitation electrode and the counter-electrode are placed side by side in the same surface side, there is a possibility of mutual contact. When the excitation electrode and the counter-electrode contact with each other electrically, corona discharge is not generated. However, when the excitation electrode and the counter-electrode are electrically insulated, corona discharge is generated securely Besides, when the electrode is covered with an insulator, as compared to a case that the conductors of the electrodes are exposed and disposed, concentration of electric field is difficult, and the corona discharge occurs in a broad glow discharge state, and therefore the scorching of the work due to concentration of electric field may be avoided, and a wide area of the work may be processed simultaneously and uniformly.

When a synthetic quartz of an impurity content of 1 ppm or less is used as an insulator, excellent insulation and durability are obtained. In the corona discharge processing, since a high voltage is applied between the excitation electrode and the counter-electrode, the insulator is required to have a high resistance to insulation breakdown. Besides, to be durable for a long period, it is required that a high insulation is maintained for a long period. The synthetic quartz of the impurity content of 1 ppm or less can satisfy the above requirements sufficiently. Practically, synthetic quartz of the impurity content of 1 ppm or less is expected to have an estimated durability of over 1,000 hours.

When the other electrode not covered with the insulator is a brush electrode composed of soft conductive metal wires bundled, even if the surface of the work has fine unevenness, the brush electrode deforms to contact securely. When the excitation electrode and the counter-electrode are oscillated along the surface of the work or are subjected to relative movement, the brush electrode is bent in the opposite direction to the moving direction to approach to and contact with another electrode, and a large current may flow to break down the circuit, but when the other electrode is covered with an insulator, it does not contact directly with the brush electrode, so that circuit breakdown may be prevented.

When either one or both of the excitation electrode and/or the counter-electrode is a rotary shaft-shaped electrode which rolls along the surface for the work, friction between the electrode and the work ma be reduced at the time of the electrode-oscillating along the surface of the electrode or the relative movement. Since the rotary shaft-shaped electrode and the work contact with each other linearly, a corona discharge is generated between this contact line and the other electrode As a result, corona discharge processing may be applied simultaneously for a wide range of the work. Furthermore, concentration of corona discharge on one point of the insulator covering the electrode may be prevented, and the life of the insulator may be extended.

When either one or both of the excitation electrode and/or the counter-electrode is a bar electrode disposed so as to set upright to the surface of the work, the electrode may contact securely by deforming itself, even if the work has fine unevenness. Since the bar electrode contacts with the surface of the work at its front tip, the electrode and the work substantially contact at a point. Therefore, if there are unevenness such as narrow grooves, holes, and step differences on the surface of the work, the tip of the electrode can reach the depth of the uneven surface, so that the electrode may contact with the surface of the work even at the deep part.

When the bar electrode is supported so as to incline to the surface of the work, taking the end portion at the side remote from the work as the fulcrum, the electrode may be moved smoothly, without being caught in the unevenness or step difference of the work, at the time of the electrodeoscillating along the surface of the work or the relative movement. When the electrode is fixed in an upright position, if the uneven surface or step difference of the work has a vertical wall surface, the side surface of the electrode may be stuck to the vertical wall surface and thus, it cannot move further. This trouble may also occur even though the electrode is possible to move elastically in the vertical direction. However, when the electrode is supported so as to be able to incline as stated above, the electrode abutting against the vertical wall surface may incline and easily ride over the vertical wall surface.

DESCRIPTION OF THE PREFERRED EMBODIMENTS

Referring now to the figures, some of the examples of this invention are described in detail below.

Figure 1:
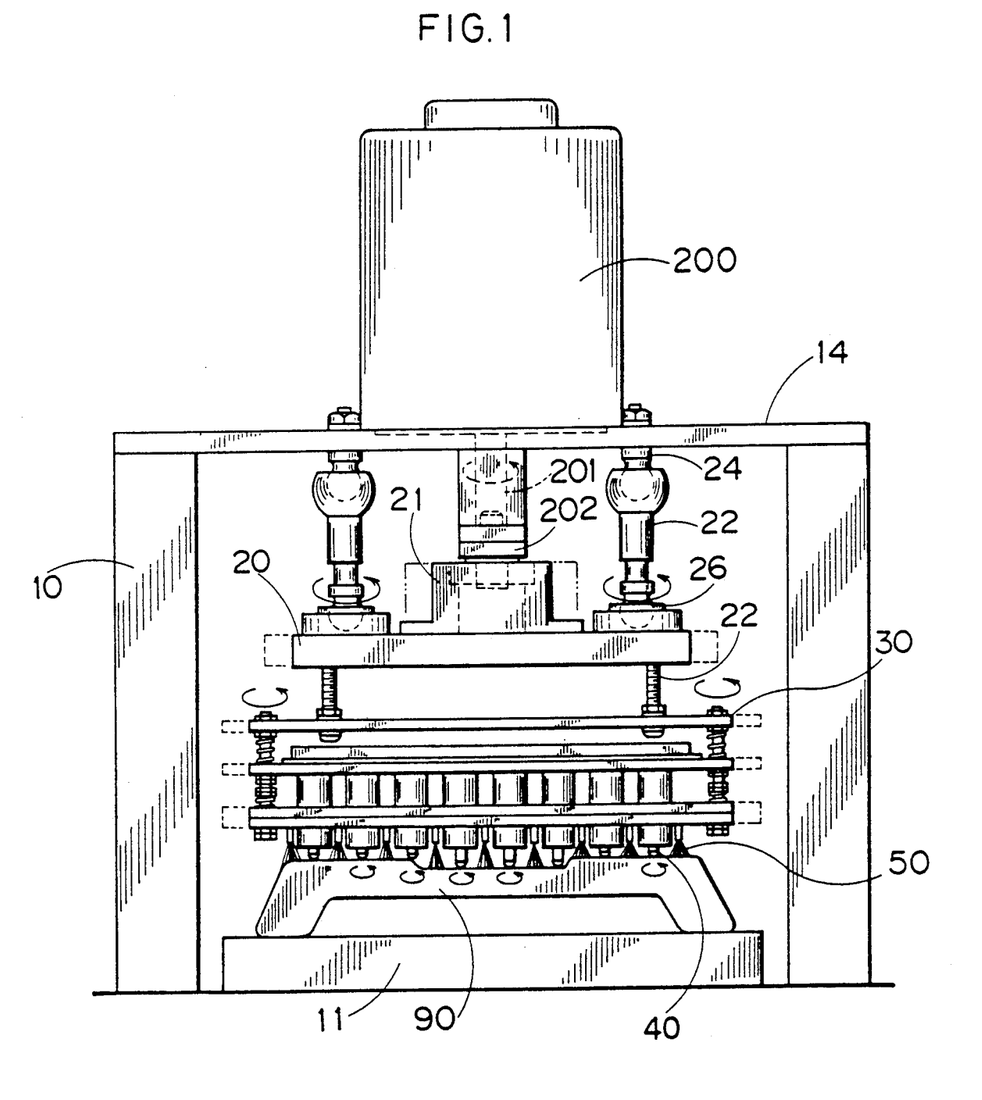
FIG. 1 is an entire structural view of a corona discharge processing apparatus showing one of the examples of the invention.

FIG. 1 shows an entire structure of a corona discharge processing apparatus. A horizontal oscillating base 20 is suspended from an apparatus frame 10. The horizontal oscillating base 20 is oscillated by a drive motor 200 fixed on the top of the apparatus frame 10 so as to draw a small circle within a horizontal plane. On the bottom of the horizontal oscillating base 20, an electrode support plate 30 is fixed by way of a bolt 22. The electrode support plate 30 is provided with a plurality of excitation electrodes 40 and counter-electrodes 50. On a base 11 beneath the electrodes 40, 50, the work 90 subjected to corona discharge processing is placed. The electrodes 40, 50 contact with the top of the work 90.

Figure 2:
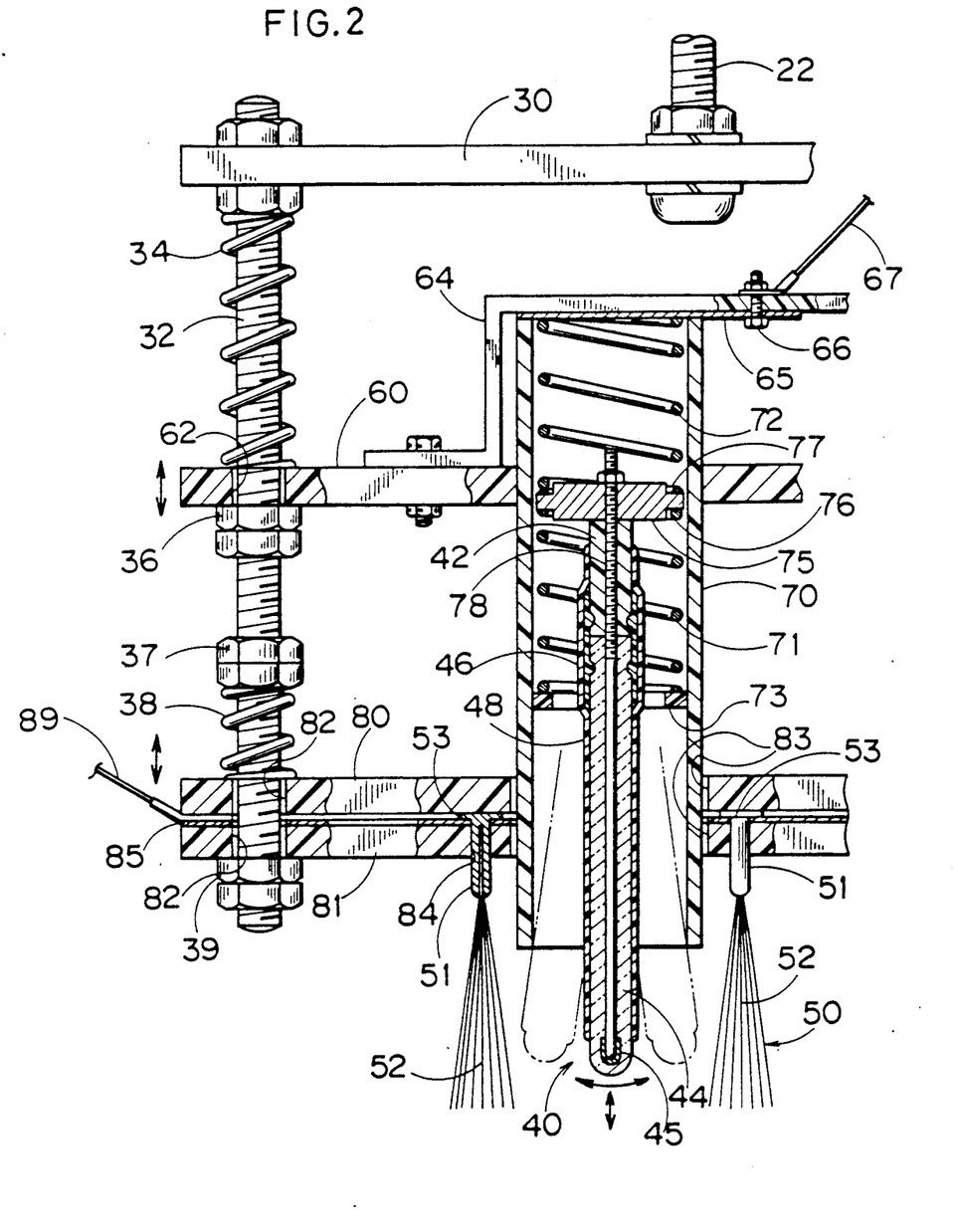
FIG. 2 is a grossly enlarged sectional structural view of the electrode portion.

The detailed structure of excitation electrodes 40 and counter-electrodes 50 is shown in FIG. 2.

On the electrode support plate 30, a bolt 32 is suspended and fixed at plural positions on the outer circumference. At an intermediate position of the bolt 32, is drilled a bolt hole 62 disposed on an excitation electrode support plate 60. The excitation electrode support plate 60 is made of an acrylic resin plate. The acrylic resin plate is excellent in durability against ozone generating by corona discharge. Between the excitation electrode support plate 60 and the electrode support plate 30, a coil spring 34 is mounted on the outer circumference of the bolt 32. In the bottom of the excitation electrode support plate 60, a nut 36 is fitted to the bolt 32. Thus, the excitation electrode support plate 60 is supported in a state being mounted on the nut 36. The excitation electrode support plate 60 is able to move upwardly, overcoming the thrusting force of the coil spring 34.

On the excitation electrode support plate 60, an electrode housing tube 70 is disposed at plural positions. The electrode housing tube 70 is made of an insulating material such as acrylic resin. In an inside surface of the electrode housing tube 70, on the way along the axial direction, annular bumps 73 are formed. The upper end of the electrode housing tube 70 is closed with a covering frame 64 fixed to the excitation electrode support plate 60. A conductive plate 65 is intervening between the covering frame 64 and the upper end surface of the electrode housing tube 70. The conductive plate 65 is provided with linking plural electrode housing tubes 70. In a part of the conductive plate 65, a wire 67 for applying voltage is connected by way of a screw 66.

Inside the electrode housing tube 70, between the conductive plate 65 and annular bumps 73, there are disposed two pieces of upper and lower coil springs 72, 71. These coil springs 72, 71 are made of a conductive material such as stainless steel. Between the upper and lower coil springs 72, 71, a disc-shaped moving piece 75 is interposed. The moving piece 75 is made of a conductive material such as stainless steel. The upper and lower coil springs 72, 71 are fitted into stepped parts 76, 77 formed on the upper and lower circumferences of the moving piece 75. Therefore, the moving piece 75 is supported as being pinched by the upper and lower coil springs 72, 71 on the way in the axial direction inside the electrode housing tube 70, and is designed to be capable of moving elastically in the up and down direction or incline, overcoming the thrusting force of the coil springs 72, 71.

In the center of the moving piece 75, a bolt 78 is provided, and is extended downward. The bolt 78 is made of a conductive material such as stainless steel. An extension tube 42 is screwed and fixed in the bolt 78. The extension tube 42 is made of an insulating material such as fluororesin etc. At the front end of the bolt 78 extended downward from the extension tube 42, a quartz tube 44 is fitted. The quartz tube 44 is projecting downward from the lower end of the electrode housing tube 70. The quartz tube 44 is closed at the front end, and has the end face formed in a spherical shape. The bolt 78 is passing closely to the tip of the quartz tube 44. The tip of the bolt 78 is processed in a spherical shape. If there is any corner or pointed portion at the front end of the bolt 78, corona discharge is generated only from such a corner or pointed portion. However, when the front end of the bolt 78 is in a spherical shape, corona discharge is generated from the entire front end surface, which is a preferable structure.

Inside the quartz tube 44, a conductive paint layer 45 is formed, covering the front end of the bolt 78. The material of the conductive paint layer 45 may be a conductive paint used as the electrode or electromagnetic wave-shielding material for electric measurements. A practical example is a conductive paint Dotight D-500 (a trade name for a product from Fujikura Chemical) which dries at ordinary temperature. The conductive paint layer 45 fills up the gap between the inside of the quartz tube 44 and the outside of the bolt 78. If there is a gap between the inside of the quartz tube 44 and the outside of the bolt 78, discharge is generated in this gap with a loss of energy. Besides, since discharge is generated through the quartz tube 44, the durability of the quartz tube 44 is spoiled. However, if the gap between the quartz tube 44 and bolt 78 is filled with the conductive paint 45 in this way, discharge is generated from the outer surface of the quartz tube 44, so that the energy may be utilized effectively and damage of the quartz tube 44 may be decreased.

Above the conductive paint layer 45, in the gap between the quartz tube 44 and the extension tube 42, an adhesive such as cyanoacrylate etc is poured to fill up the gap. As said adhesive, a solvent-free adhesive such as cyanoacrylate is desired because the viscosity is low and the volume decrease due to hardening is small.

The outer side of the linkage part between the extension tube 42 and quartz tube 44 is covered with a heat-shrinking linkage sleeve 46 made of fluororesin or the like and then, is shrunk with heating. By this linkage sleeve 46, the extension tube 42 and quartz tube 44 are coupled and fixed.

Outside the linkage sleeve 46, a heat-shrinking insulation sleeve 48 made of fluororesin or the like is disposed to cover the almost entire surface of the quartz tube 44 and extension tube 42. The insulation sleeve 48, by being shrunk with heating, comes tightly contact with and covers the outside of both of the quartz tube 44 and extension tube 42. At the front end of the quartz tube 44, only the portion near the position forming the conductive paint layer 45 is exposed from the insulation sleeve 48. As a result, corona discharge is generated only in the front end portion exposed from the insulation sleeve 48, and a creeping corona discharge may be generated efficiently along the surface of the work 90.

Figure 4:
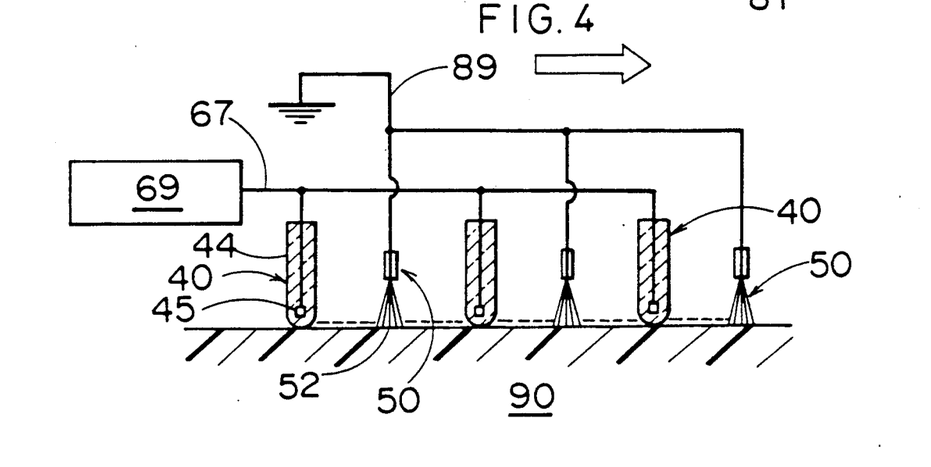
FIG. 4 is a schematic structural view showing the wiring structure.

The excitation electrode 40 is structured as described above, and an electrical wiring route is formed from the wiring 67 for voltage applying to the conductive paint layer 45. Explaining the wiring route in sequence, the wiring 67, screw 66, conductive plate 65, coil spring 72, moving piece 75, bolt 78, and conductive paint layer 45 are connected in this sequence. Therefore, as shown in FIG. 4, when a high voltage is applied from a power source 69 for a wiring 67, a high voltage is applied for the conductive paint layer 45 covered with the quartz tube 44.

The structure of the counter-electrode 50 is described below.

As shown in FIG. 2, at a lower position from the nut 36 of the bolt 32 suspended from said electrode support plate 30, a nut 37 is fitted and fixed. A coil spring 38 is fitted to the bolt 32 beneath the nut 37. Bolt holes 82, 82 of a pair upper and lower counter-electrode support plates 80, 81 are provided for the bolt 32 beneath the coil spring 38. The counter-electrode support plates 80, 81 are made of an insulating material such as acrylic resin etc. On the bottom face of the counter-electrode support plate 81, a nut 39 is fitted and fixed to the bolt 32. Therefore, the counter-electrode support plates 80, 81 are fitted to the bolt 32 in a state of being supported by the nut 39. The counter-electrode support plates 80, 81 are designed to be capable of moving elastically upwardly, overcoming the thrusting force of the coil spring 38.

A penetration hole 83 in which the electrode housing tube 70 is inserted is formed in the counter-electrode support plates 80, 81. The electrode housing tube 70 inserted into the penetration hole 83 is projecting downward from the counter-electrode support plate 81. A plurality of tiny penetration holes 84 are formed in the periphery of the penetration hole 83 in the lower counter-electrode support plate 81. The shaft part 51 of the brush counter-electrodes 50 is fitted in these tiny penetration holes 84. The shaft part 51 of the counter-electrodes are made of a conductive metal such as stainless steel etc., and a flange part 53 is formed at the upper end. A brush 52 formed by bundling multiple conductive metal wires such as soft stainless steel wires etc. is planted in each shaft part 51. The brush counter-electrode 50 is fitted into the penetration hole 83 from above the lower counter-electrode support plate 81, and fixes the flange part 53 by pinching with the pair of upper and lower counter-electrode support plates 80, 81. The front end of the brush 52 is extended slightly downward from the front end of the excitation electrode 40. On the upper surface of the counter-electrode support plate 81, a conductive paint layer 85 is formed to link electrically plural brush counter-electrodes 50 by the conductive paint layer 85. In a part of the conductive paint layer 85, an earth wire 89 is connected. That is, as shown in FIG. 4, the plural brush counter-electrodes 50 are electrically connected to the wire 89, and the wire 89 is grounded.

Figure 3:
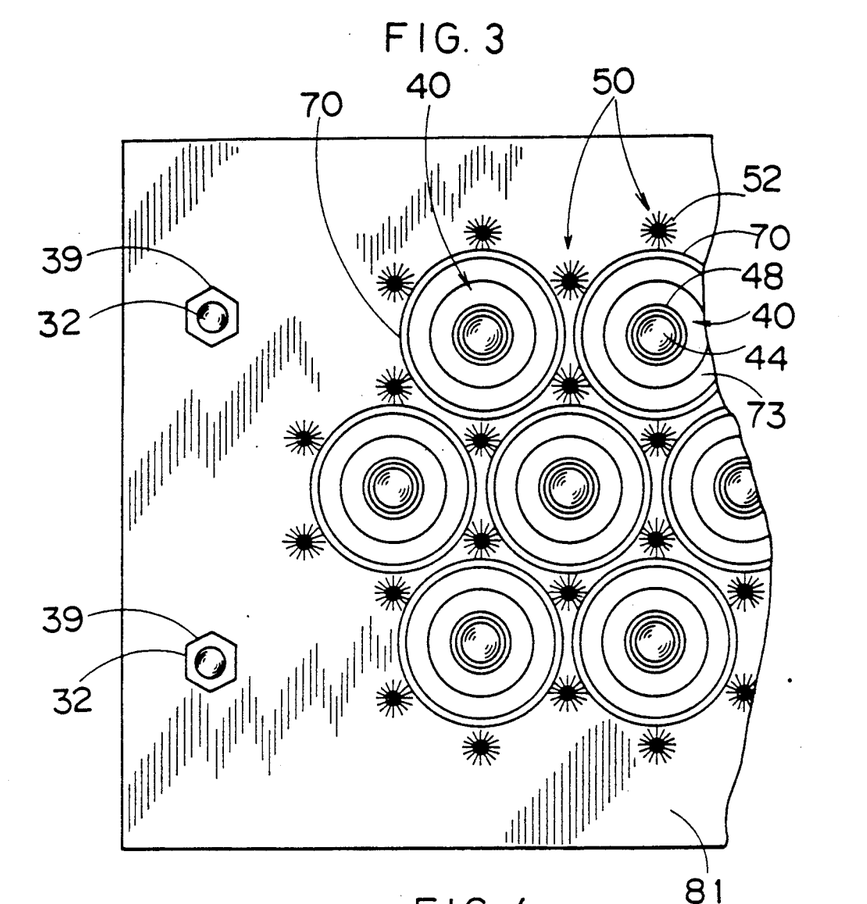
FIG. 3 is a bottom surface view of the electrode portion.

Such flat structure of the electrodes is shown in FIG. 3. Multiple excitation electrodes 40 and electrode housing tubes 70 are arranged zigzag in both lateral and vertical directions. The counter-electrodes 50 are disposed along the outer circumference of the excitation electrodes 40 and electrode housing tubes 70. Six counter-electrodes 50 are disposed on the outer circumference of each electrode housing tube 70. However, in the position where the electrode housing tubes 70 are adjacent to each other, one counter-electrode 50 is shared by the both electrode housing tubes 70. Since the state of corona discharge varies depending on the arrangement interval between the excitation electrode 40 and counter-electrode 50, the electrode interval is set so as to generate a favorable corona discharge. Practically, when the applying voltage is 25 kV, the electrode interval is about 10 mm at maximum. However, since the state of generation of corona discharge varies with the material and surface state of the insulator and with ambient temperature and humidity and other conditions, the electrode interval and output voltage must be determined with consideration of such conditions.

Using thus-composed electrodes 40, 50, corona discharge processing is performed. As shown in FIG. 1, beneath the corona discharge processing apparatus, the work 90 such as a synthetic resin forming and the like is placed. It is prepared so that both the front ends of the excitation electrodes 40 and the counter-electrodes 50 come in contact with the surface of the work 90. In this state, when a high voltage is applied for the excitation electrodes 40 as shown in FIG. 4, a strong electric field is generated between the grounded counter-electrodes 50 and the excitation electrodes 40. By this electric field, a creeping corona discharge is generated from the contact points of the excitation electrodes 40 with the work 90 toward the contact points of the work 90 with the counter-electrodes 50, by way of the surface of the work 90. By this creeping corona discharge, the surface of the work 90 is processed with corona discharge. The applying voltage is about 10 to 40 kV, or preferably about 20 to 30 kV. The higher the applying voltage, the easier the corona discharge is, and the discharge processing effect becomes better, but when the applying voltage is too high, the durability of the insulator to cover the electrodes is lowered. The frequency is 1 to 100 kHz, or preferably in an order of 5 to 10 kHz.

Figure 5:
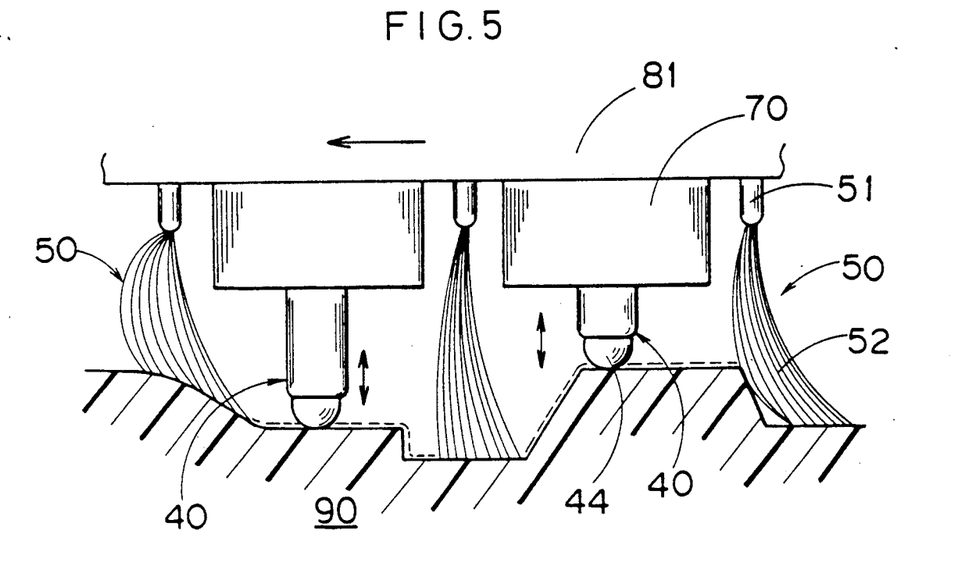
FIG. 5 is an explanatory view showing a processing state.

When the surface of the work 90 is even, the excitation electrodes 40 and the counter-electrodes 50 may be fixed, but when the surface of the work 90 is uneven, countermeasures to the unevenness should be required for the excitation electrodes 40 and the counter-electrodes 50. In the forementioned example, as shown in FIG. 5, both the excitation electrodes 40 and the counter-electrodes 50 are designed to cope with surface unevenness of the work 90. The excitation electrodes 40 are able to come always contact securely with the surface of the work 90 even if there are step differences on the surface of the work 90, because the quartz tube 44 of a vertical axis type and the moving piece 75 move elastically in the up and down direction by the action of the coil springs 71, 72. The counter-electrodes 50 may come always in contact with the surface of the work 90 as the flexible brush 52 deforms according to the uneven contour of the work 90.

Figure 6:
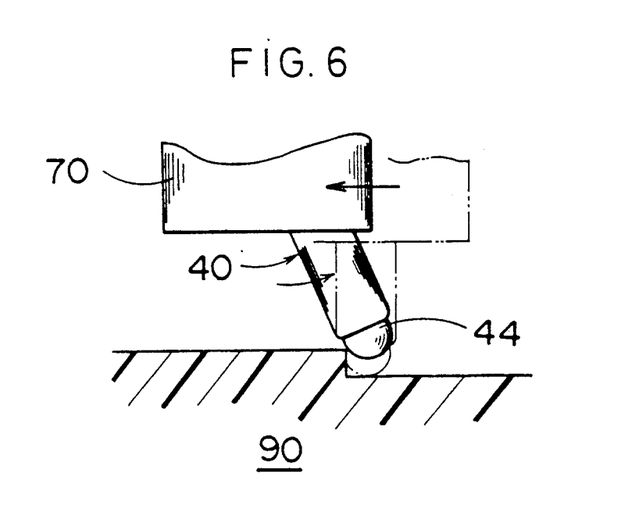
FIG. 6 is an explanatory view showing another processing state.

Besides, as shown in FIG. 6, when the excitation electrodes 40 is moved along the surface of the work 90, the quartz tube 44 of the excitation electrodes 40, by inclining itself, can easily ride over the step differences of the work 90. The quartz tube 44 riding over the step differences immediately restores the original upright state. This inclination and restoring action of the quartz tube 44 may be achieved because the moving piece 75 is elastically supported by being pinched between the upper and lower coil springs 71, 72.

The operating structure of the horizontal oscillating base 20 is explained below.

As shown in FIG. 1, the horizontally-oscillating base 20 is suspended on the upper structure member 14 of the apparatus frame 10 by means of a plurality of spherical joint links 22. In the under surface of the upper structure member 14, a spherical joint member 24 to be fitted in the end portion of the spherical joint link 22 is fixed. A spherical joint member 26 fitted in the end portion of the spherical joint link 22 is also fixed on the upper surface of the horizontally-oscillating base 20. The spherical joint link 22 and the spherical joint members 24, 26 are fitted together so as to be capable of rotating and bending in an optional direction. Therefore, the horizontallyoscillating base 20 is able to oscillate freely in the horizontal direction in a state of being suspended from the upper structure member 14.

Figure 7:
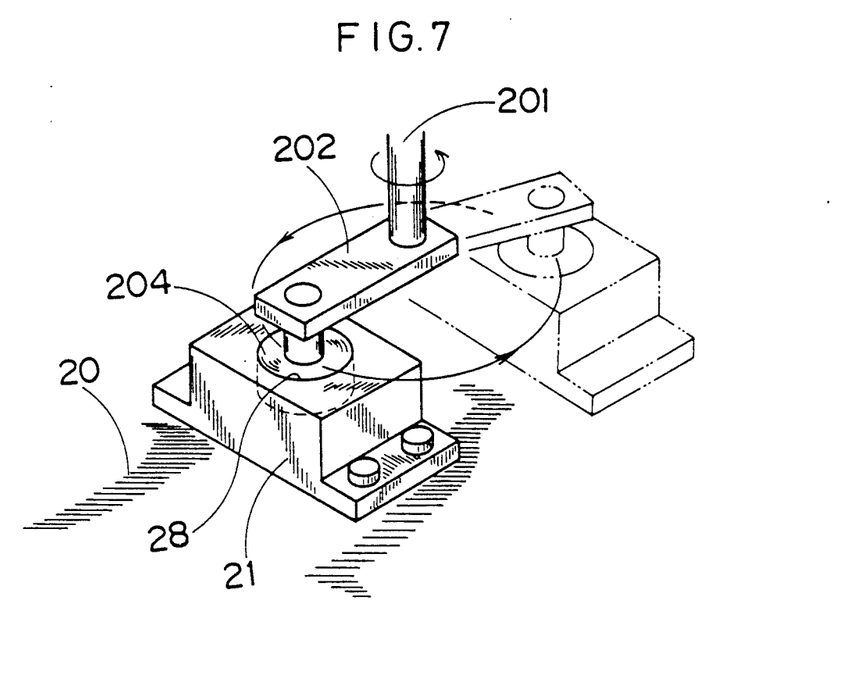
FIG. 7 is a perspective view showing the structure of essential parts of horizontally oscillating means.

A drive motor 200 has a drive shaft 201 projected downward from the upper structure member 14. On the upper surface of the horizontally-oscillating base 20, a bearing pedestal 21 is fixed, and the drive shaft 201 and the bearing pedestal 21 are joined by a crank arm 202. A detailed structure of the linkage portion is shown in FIG. 7. To the drive shaft 201, the crank arm 202 extended in the horizontal direction is fixed. On the lower face of the end portion of the crank arm 202, a roller 204 is fixed. The roller 204 is in a rotatable manner fitted into the bearing hole 28 in the bearing pedestal 21.

As the drive shaft 201 of the drive motor 200 rotates, the roller 204 makes a circular motion by way of the crank arm 202, and the bearing pedestal 21 also makes a circular motion along with the motion trajectory of the roller 204. The horizontally-oscillating base 20 on which the bearing pedestal 21 is fixed is able to oscillate in the horizontal direction by an action of the spherical joint link 22, so that the horizontally-oscillating base 20 will also oscillate, together with the bearing pedestal 21, in a circular trajectory within the horizontal plane.

Figure 8:
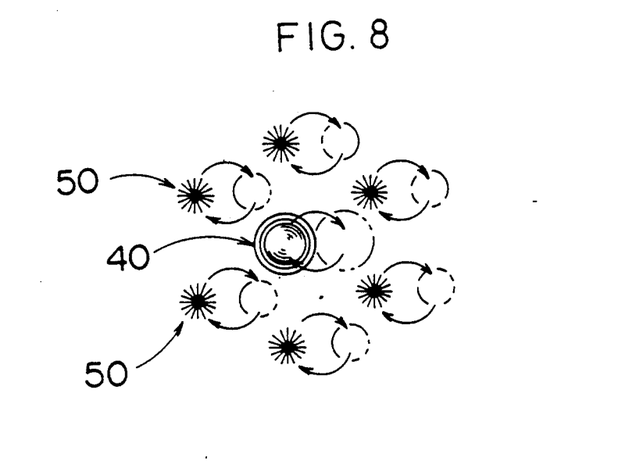
FIG. 8 is an outline layout showing the oscillating state of the electrode.

In this way, when the horizontally-oscillating base 20 makes a circular motion in the horizontal plane, as shown in FIG. 8, the excitation electrodes 40 and the counter-electrodes 50 also oscillate in their respective circular trajectories. Therefore, the excitation electrodes 40 and the counter-electrodes 50 process corona discharge while making a circular motion in contact with the surface of the work 90.

Figure 9:
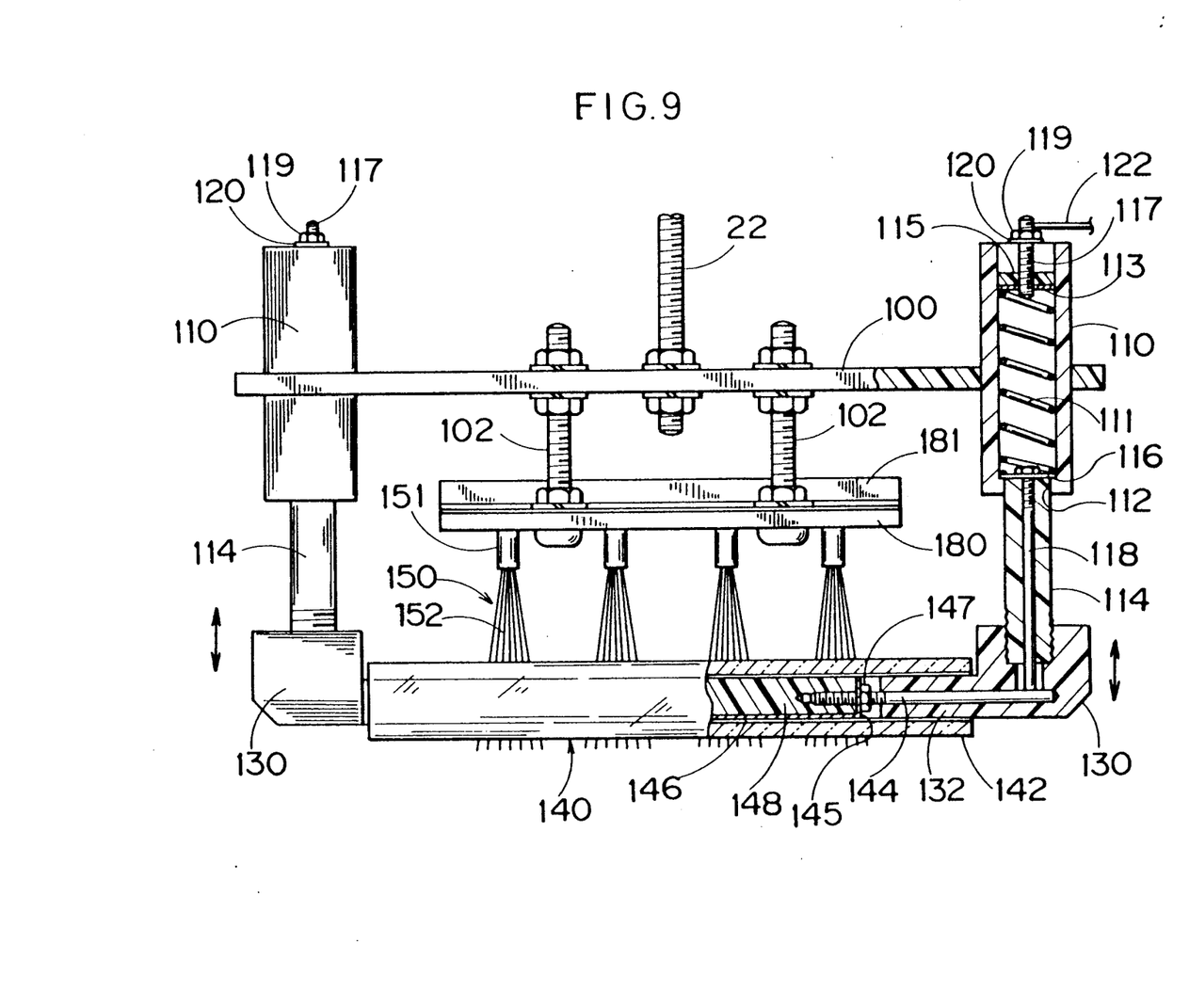
FIG. 9 is a partially sectional front view showing an example differing in the electrode structure.
Figure 10:
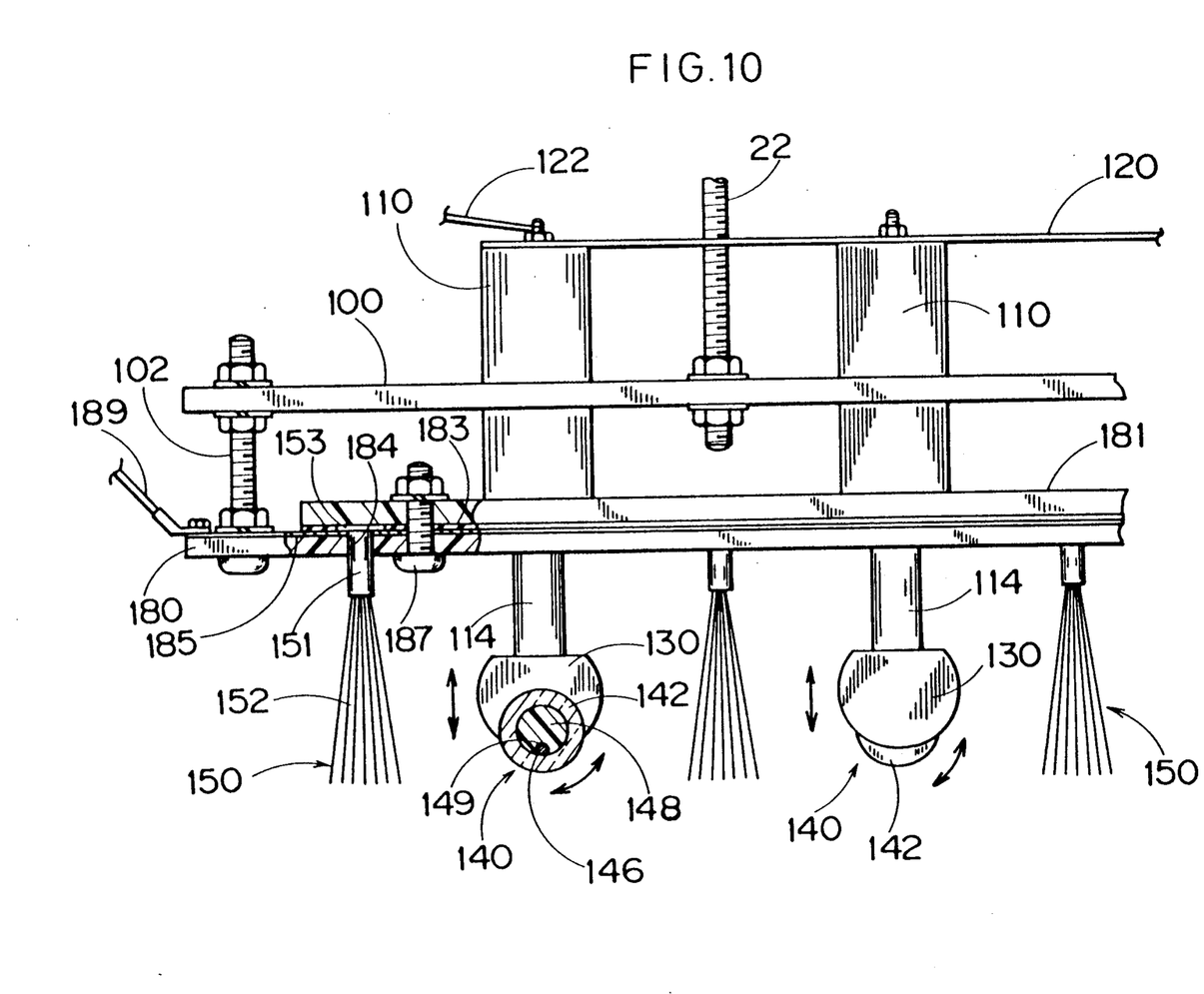
FIG. 10 is a partially sectional side view.

Next, in FIG. 9 and FIG. 10, another embodiment differing in the electrode structure is shown.

The horizontally-oscillating base 20 is suspended from the apparatus frame 10, and the bolt 22 is fitted to the under face of the horizontally-oscillating base 20, same as in the foregoing example.

At the lower end of the bolt 22, an excitation electrode support plate 100 is fixed. The excitation electrode support plate 100 is made of an acrylic resin. Near the outer circumference in the opposite side of the excitation electrode support plate 100, a vertical electrode support tube 110 made of an acrylic resin or the like is fixed. A plural number of the electrode support tubes 110 are disposed at a specific intervals along the opposite side of the excitation electrode support plate 100. Inside the lower end of the electrode support tube 110, annular bumps 112 are disposed. At the lower end of the electrode support tube 110, a piston shaft 114 is inserted so as to be capable of moving in and out. The piston shaft 114 is made of an insulating material such as fluororesin etc. At the upper end of the piston shaft 114, a conductive plate 116 hooking on said annular bumps 112 is fixed with bolt 118. The piston shaft 114 is suspended from the electrode support tube 110.

Inside the electrode support tube 110, in the upper part of the conductive plate 116, a coil spring 111 made of a conductive material such as stainless steel is accommodated. Above the coil spring 111, a conductive plate 113 is mounted. A lid 115 made of a resin plate is fitted on the conductive plate 113. In the center of lid 115 and conductive plate 113, a bolt 117 made of stainless steel or the like is driven. The bolt 117 is projected to the upper end of the electrode support tube 110. At the upper end of the bolt 117, a linking conductive plate 120 is fitted, and its upper part is tightened and fixed with a nut 119. The linking conductive plate 120 is disposed by linking plural electrode support tubes 110 which are arranged along the same side of the excitation electrode support plate 100. In a part of the linking conductive plate 120, a wiring 122 coming from the high voltage power source is connected.

Said piston shaft 114 is designed to be capable of moving elastically in the up and down direction, overcoming the thrusting force of the coil spring 111. The lower end of piston shaft 114 is screwed and fixed into an elbow member 130. The elbow member 130 is made of an insulating material such as fluororesin. At the upper end of the piston shaft 114, the bolt 118 which is fixing the conductive plate 116 is passed into the inside of elbow member 130 through the center of piston shaft 114.

In the elbow member 130 a bearing part 132 projecting to the inner side is disposed. A bearing part 132 of the elbow member 130 disposed at an opposite position has the both ends of the slender quartz tube 142 fitted thereto. The quartz tube 142 is fitted with a slight gap so as to be able to rotate lightly for the bearing part 132.

Inside the quartz tube 142, a bolt 144 is inserted in the horizontal direction from the end of the bearing part 132 toward the outside. The front end of the bolt 144 reaches the bottom of the bolt 118 in the vertical direction which is passed inside the piston shaft 114. By tightening the bolt 118 drive in the piston shaft 114, the bolt 144 in the horizontal direction is pressed and fixed.

The bolt 144 extends inward. A ring metal 145 is fitted in the bolt 144. At the lower end of the outer circumference of ring metal 145, an electrode shaft 146 is installed. The electrode shaft 146 extends in the horizontal direction. Also at the opposing elbow member 130, the ring metal 145 is fitted into the bolt 144. The electrode shaft 146 links both the ring metal 145 in both sides.

Between the ring metals 145 confronting at both sides, an insulation resin bar 148 made of fluororesin or the like is provided. The bolt 144 is inserted into the end face of the insulation resin bar 148. By the nut 147 driven into an intermediate position of the bolt 144, the ring metal 145 is tightened to fix the insulation resin bar 148. The insulation resin bar 148 has a columnar shape slightly smaller than the quartz tube 142. In the insulation resin bar 148 a groove 149 is formed at a position where the electrode shaft 146 passes through and the electrode shaft 146 is fitted into this groove 149.

The quartz tube 142 and its internal structure described above make up the excitation electrode 140. The wiring route toward the excitation electrode 140 is explained collectively. That is, the wiring 122 is connected to the linking conductive plate 120, bolt 117, conductive plate 113, coil spring 11, conductive plate 116, bolt 118, bolt 144, ring metal 145, and electrode bar 146. The wiring 122 is connected, though not pictured, to the high voltage power source, same as in the foregoing example.

Next, the structure of the counter-electrode is explained.

As shown in FIG. 10, a counter-electrode support plate 180 is fixed to the lower part of the excitation electrode support plate 110 through a bolt 102. In the counter-electrode support plate 180, a penetration hole 184 is formed at a position adjacent to the excitation electrode 140. A shaft part 151 of a brush electrode 140 having a structure same as that in the foregoing example is fitted into the penetration hole 184. The brush 152 is extending to the lower end of the shaft part 151. On the counter-electrode support plate 180, the other counter-electrode support plate 181 is mounted by way of a rubber plate 183 and it is tightened and fixed with bolt 187. On the upper surface of the counter-electrode support plate 180, a conductive paint layer 185 is formed. The conductive paint layer 185 is in contact with the flange par 153 of each counter-electrode 150 to link the counter-electrodes 150 electrically. In a part of the conductive paint layer 185, a wiring 189 to be grounded is connected.

As shown in FIG. 9, a plurality of counter-electrodes 150 are arranged and mounted in a direction parallel to the excitation electrodes 140.

In the examples explained above, if the surface of the work is uneven, the piston shaft 114 elastically moves up and down by the action of the coil spring 11, so that the excitation electrodes 140 may move along the uneven surface of the work. The counter-electrodes 150 cope with the uneven surface of the work by deforming the brushes 52 flexibly which is the same as in the foregoing example.

Figure 11:
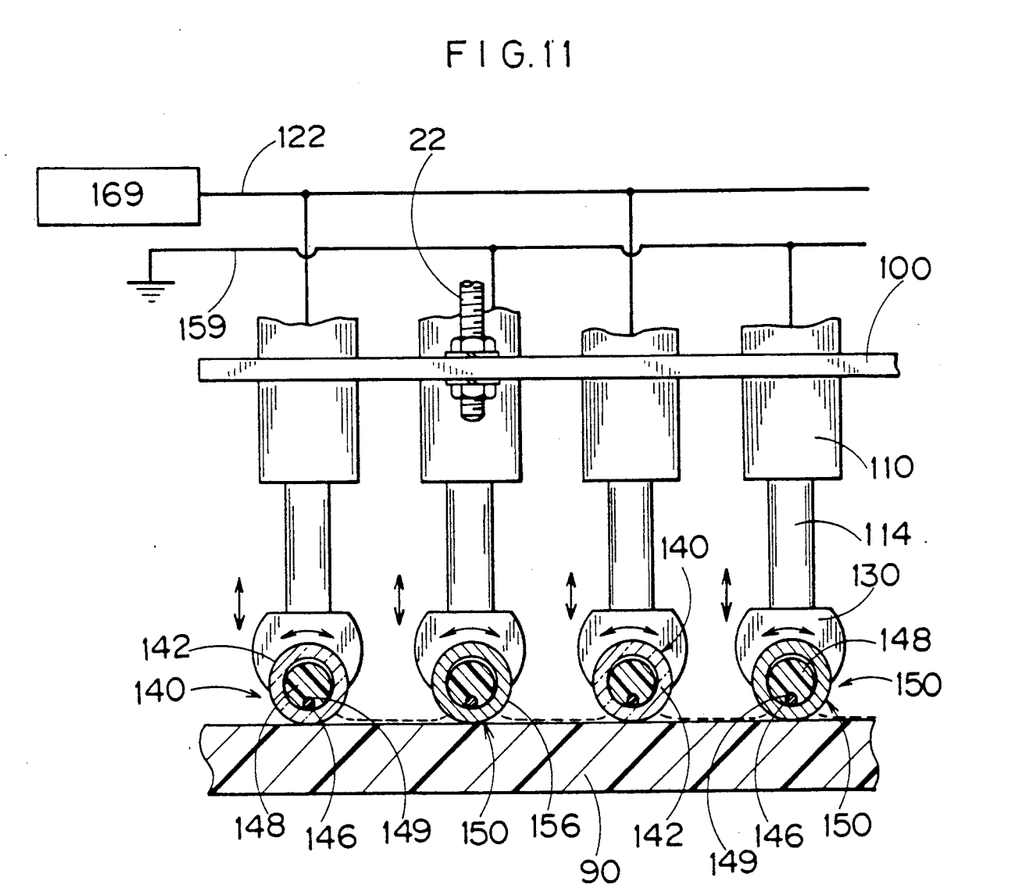
FIG. 11 is an outline structural view showing an example differing in the electrode structure.

Next, the example shown in FIG. 11 has a structure partly different from the foregoing example. The excitation electrodes 140 may be exactly the same as in the above example. The basic structure of the counter-electrodes 150 is identical with the structure of the excitation electrodes 140, except that an electrode tube 156 made of a conductive material such as stainless steel is used instead of the quartz tube 142 in the excitation electrode 140. The excitation electrodes 140 are, same as in the foregoing examples, connected to a high voltage power source 169 by way of a wiring 122. The counter-electrodes 150 are grounded by way of another wiring 159.

In this example, since both the excitation electrodes 140 and the counter-electrodes 150 contact with the work linearly, the entire surface of the work between the excitation electrodes 140 and the counter-electrodes 150 may be simultaneously and uniformly processed.

In the example shown in FIG. 11, although the excitation electrodes 140 and the counter-electrodes 150 are disposed on the upper face of the work 90, the structure in FIG. 11 which is turned upside down may be used. That is, the rotary shaft-shaped excitation electrodes 140 and the counter-electrodes 150 are set upward, and the electrode support tubes 110 are set downward. On the excitation electrodes 140 and the counter-electrodes 150, the work 90 is put and corona discharge is generated. In such a structure, the excitation electrodes 140 and the counter-electrodes 150 work as a kind of roller conveyors, and corona discharge may be effected while sliding the work 90 on the excitation electrodes 140 and the counter-electrodes 150. Furthermore, when the excitation electrodes 140 and the counter-electrodes 150 are rotated and driven by a motor and the like, the work 90 may be forced to slide.

Next is explained the insulating performance of the quartz tube used as the insulator for covering the electrodes in said forementioned examples.

Conventionally, a general material for insulators was fluororesin. In this invention too, the fluororesins may be used, but the durability is superior by using quartz which is excellent in insulating performance as compared with fluororesins.

Figure 12:
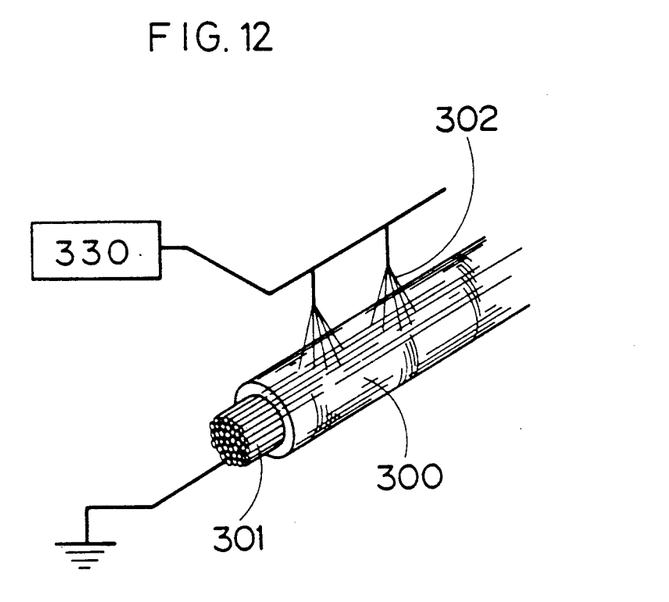
FIG. 12 is an explanatory view showing the method used to evaluate and test an insulator.

In order to evaluate the durability of the insulator, the experiment as shown in FIG. 12 was conducted.

A bundle of steel wires 301 was inserted into a tube 300 made of various insulators. The steel wires 301 are grounded. A brush excitation electrode 302 was made to contact with the outer circumference of the tube 300. A corona discharge was generated by applying a voltage of 25 kV from a high voltage power source 330 for the excitation electrode 302, and the time until the tube 300 reached the insulation breakdown was measured.

The results are shown in Table 1. In the table, "quartz (opaque)" in the column of material refers to a case of using natural quartz relatively low in purity, and "quartz (transparent)" relates to a case of using synthetic quartz of impurity of 1 ppm or less.

TABLE 1

| Material | Wall thickness mm | Inside diameter mm | Durability sec |
| --- | --- | --- | --- |
| Fluororesin | 0.5 | 1.0 | 53.7 |
| Fluororesin | 0.5 | 2.0 | 38.9 |
| Fluororesin | 0.5 | 3.0 | 38.9 |
| Fluororesin | 1.0 | 2.0 | 796 |
| Quartz (opaque) | 0.4 | 1.5 | 5.0 |
| Quartz (opaque) | 0.4 | 2.5 | 13.4 |
| Quartz (opaque) | 0.7 | 6.5 | >3600 |
| Quartz (opaque) | 1.0 | 10.5 | >9000 |
| Quartz (opaque) | 0.5 | 4.5 | 3960 |
| Quartz (transparent) | 0.7 | 2.5 | >7200 |

It is known from the above result that the quartz is excellent in the durability against a high voltage as compared with fluororesins. Moreover, estimating from the above result, the durability is expected to exceed 1,000 hours in the case of synthetic quartz tube in which impurity content is 1 ppm or less and wall thickness 1.7 mm.

Using the corona discharge processing apparatus of the invention, corona discharge processing was tested on synthetic resin formings, of which result is described below.

As the corona discharge processing apparatus, the structure shown in FIGS. 9, 10 (apparatus I), and the structure shown in FIGS. 2 to 5 (apparatus II) were used. The work was a fragment of a rear bumper for automobiles made of polypropylene. The high voltage power source was model HFS-203 manufactured by Kasuga Denki Co. (oscillation frequency 5 kHz, output 2 kW, and output voltage 40 kVp-p max). As the processing conditions, the applied voltage was 25 kV and 30 kV, and the processing time was 15, 30 and 60 seconds.

In order to check the effect of the corona discharge processing, a paint was applied for the work after processing and the coating performance was evaluated. The paint used in the experiment was a polyurethane paint of a two-component liquid type (R-271 white +hardening agent+exclusive thinner, produced from Nippon B-Chemical Co.). Evaluation of the coating performance was carried out by testing the peeling strength with a Tensilon tester. An apparatus for the test was a universal tensile tester model PTM-50 made of Orientech Co. The results are shown in Tables 2 and 3.

TABLE 2

[Treating voltage: 25 kV]

| | Electrode structure | Processing sec × times | Oscillation | Peeling strength g/cm Max. | Min. |
| --- | --- | --- | --- | --- | --- |
| Example 1.1 | I | 30 × 1 | Oscillated | 1000 | 500 |
| Example 1.2 | I | 30 × 2 | Oscillated | 1000 | 600 |
| Example 1.3 | I | 60 × 1 | Oscillated | 1200 | 600 |
| Example 1.4 | I | 60 × 2 | Oscillated | 1200 | 800 |

TABLE 3

[Treating voltage: 30 kV]

| | Electrode structure | Processing sec × times | Oscillation | Peeling strength g/cm Max. | Min. |
| --- | --- | --- | --- | --- | --- |
| Example 2.1 | II | 30 × 1 | Oscillated | 1300 | 600 |
| Example 2.2 | II | 15 × 2 | Oscillated | 1300 | 800 |
| Example 2.3 | II | 10 × 3 | Oscillated | 1200 | 800 |
| Example 2.4 | II | 15 × 1 | Oscillated | 900 | 400 |
| Example 2.5 | II | 60 × 1 | Oscillated | 1100 | 700 |
| Example 2.6 | II | 30 × 2 | Oscillated | 1000 | 700 |
| Example 2.7 | II | 60 × 2 | Oscillated | 1100 | 600 |

Thus as described above, according to the corona discharge processing apparatus in the present invention, since the corona discharge processing is performed by keeping the excitation electrodes and the counter-electrodes in contact with the same surface side of the work, a uniform corona discharge processing effect may be obtained regardless of the thickness of the work. Therefore, as experienced in the conventional apparatus, fluctuations of the processing effects due to variation in the partial thickness of the work does not occur, and a uniform corona discharge processing may be applied for the entire surface of the work. Besides, even if the work is very thick, a favorable processing effect is obtained, and failure of processing due to excessive thickness of the work as in the prior art will not be experienced.

If the surface shape of the work has complicated unevenness, the excitation electrodes and the counter-electrodes may be disposed along the uneven surface, so that a uniform and superb corona discharge processing effect will be obtained regardless of the uneven shapes.

Moreover, since it is not necessary to use counter-electrodes fabricated to a shape which is corresponding to the back shape of the work as required conventionally, the labor for fabrication of electrodes may be saved and the cost may be hence reduced.

What is claimed is:

1. A corona discharge processing apparatus for treating a work having a surface of varying height by creeping corona discharge, comprising:
   a first electrode of a brush type held against said work surface;
   a second electrode spaced from said first electrode and resiliently held against said work surface, said second electrode being at least one of a bar electrode and a rotary shaft-shaped electrode; and
   means for applying an electric charge of high frequency and high voltage between said first and second electrodes to cause generation of a corona discharge along said work surface between said electrodes.

2. A corona discharge processing apparatus according to claim 1, further comprising means for oscillating said electrodes within a plane along said work surface.

3. A corona discharge processing apparatus according to claim 2, wherein said oscillating means causes the electrodes to oscillate in circular trajectories.

4. A corona discharge apparatus according to claim 1, wherein at least one of said electrodes is covered with an insulator.

5. A corona discharge processing apparatus according to claim 4, wherein the insulator is a synthetic quartz of impurity content of 1 ppm or less.

6. A corona discharge processing apparatus according to claim 4, wherein an electrode not covered with an insulator is a brush electrode formed by bundling soft metal wires.

7. A corona discharge processing apparatus according to claim 1, wherein at least one of said electrodes is a rotary shaft-shaped electrode making rolling contact with said work surface.

8. A corona discharge processing apparatus according to claim 1, wherein at least one of said electrodes is a bar electrode disposed upright to the work surface.

9. A corona discharge processing apparatus for treating a work having a surface of varying height by creeping corona discharge, comprising:
   a first electrode of at least one of a bar electrode and a rotary shaft-shaped electrode resiliently held against said work surface;
   a second electrode of at least one of a bar electrode and a rotary shaft-shaped electrode resiliently held against said work surface; and
   means for applying an electric charge of high frequency and high voltage between said first electrode and said second electrode to cause generation of a corona discharge between said electrodes along said work surface.

10. A corona discharge processing apparatus according to claim 9, further comprising means for oscillating said electrodes within a plane along said work surface.

11. A corona discharge processing apparatus according to claim 10, wherein said oscillating means causes the electrodes to oscillate in circular trajectories.

12. A corona discharge processing apparatus according to claim 9, wherein at least one of said electrodes is covered with an insulator.

13. A corona discharge processing apparatus according to claim 12, wherein the insulator is a synthetic quartz of impurity content of 1 ppm or less.

14. A corona discharge processing apparatus according to claim 9, wherein at least one of said electrodes is a rotary shaft-shaped electrode making rolling contact with said work surface.

15. A corona discharge processing apparatus according to claim 9, wherein at least one of said electrodes is a bar electrode disposed upright to the work surface.

16. A corona discharge processing apparatus for treating a work by creeping corona discharge comprising:
   a first electrode resiliently held against a surface of said work;
   a second electrode resiliently held against said surface of said work spaced from said first electrode; and
   means for generating a corona discharge along said work surface between said first and second electrodes;
   wherein said first electrode is a bar electrode disposed upright to said work surface and supported as a fulcrum at an end remote from the work so as to incline upon contact with a work surface irregularity moving laterally against said electrode.

* * * * *